(12) United States Patent
Riley-Carter et al.

(10) Patent No.: US 10,271,617 B2
(45) Date of Patent: Apr. 30, 2019

(54) DEVICE AND SYSTEM FOR ASSISTING ACTUATION OF A BUCKLE RELEASE

(71) Applicant: Namra LLC, Quartz Hill, CA (US)

(72) Inventors: Kristin Riley-Carter, Quartz Hill, CA (US); Mauro Riley-Guglielmo, Quartz Hill, CA (US)

(73) Assignee: Namra LLC, Lancaster, CA (US)

( * ) Notice: Subject to any disclaimer, the term of this patent is extended or adjusted under 35 U.S.C. 154(b) by 0 days.

(21) Appl. No.: 15/799,911

(22) Filed: Oct. 31, 2017

(65) Prior Publication Data

US 2018/0116344 A1 May 3, 2018

Related U.S. Application Data

(60) Provisional application No. 62/415,407, filed on Oct. 31, 2016.

(51) Int. Cl.
| | |
|---|---|
| A44B 11/25 | (2006.01) |
| B60N 2/28 | (2006.01) |
| A44B 15/00 | (2006.01) |

(52) U.S. Cl.
CPC ...... *A44B 11/2573* (2013.01); *A44B 11/2523* (2013.01); *A44B 11/2526* (2013.01); *A44B 11/2546* (2013.01); *A44B 11/2549* (2013.01); *A44B 11/2511* (2013.01); *A44B 15/005* (2013.01); *B60N 2/2812* (2013.01); *B60N 2002/2818* (2013.01)

(58) Field of Classification Search
CPC ..... B25B 9/02; A47G 21/106; B29C 66/8614; A01B 1/18; Y10T 24/44778; Y10T 24/4494; Y10T 24/44274; Y10T 24/44641; Y10T 24/4465; Y10T 24/44923; Y10T 24/44769; D06F 55/00
See application file for complete search history.

(56) References Cited

U.S. PATENT DOCUMENTS

| | | | |
|---|---|---|---|
| RE32,338 E | * 1/1987 | Alexander | A61B 17/122 294/16 |
| 4,938,214 A | * 7/1990 | Specht | A61B 17/062 606/167 |
| 5,282,737 A | 2/1994 | Ray | |
| 5,625,931 A | * 5/1997 | Visser | A44B 99/00 24/508 |
| 7,384,086 B2 | 6/2008 | Lukaszynski et al. | |
| 8,539,862 B1 | 9/2013 | Robinson | |

(Continued)

OTHER PUBLICATIONS

Barbara Heilman arid Becca Davison, UnbuckleMe product, https://unbuckleme.com/.

(Continued)

*Primary Examiner* — Robert Sandy
*Assistant Examiner* — Michael S Lee
(74) *Attorney, Agent, or Firm* — KW Law, LLP

(57) ABSTRACT

A device and system that can be used to assist actuation of a buckle release is disclosed. A device can include a first arm and a second arm joined by a U-shaped connecting portion. The device can also include a button contact feature. The device can be inserted over a buckle with the button contact feature over a buckle release button, and the device used to assist engagement of the buckle release button by a person operating the device. A system can include a device and various additional features or accessories.

12 Claims, 11 Drawing Sheets

(56) References Cited

U.S. PATENT DOCUMENTS

2011/0308057 A1* 12/2011 Abrams .................. B25B 7/02
  29/426.5
2018/0071902 A1 3/2018 Davison et al.

OTHER PUBLICATIONS

CSC Solutions LLC, Bucklebee product, http://www.bucklebee.com/.
Marlene Robinson, BuckleBopper product, https://bucklebopper.com/.
Mathiowetz et al., "Grip and Pitch Strength: Normative Data for Adults," Arch. Phys. Med. Rehabil., vol. 66, pp. 69-74 (1985).
U.S. Appl. No. 62/394,080, filed Sep. 13, 2016.

* cited by examiner

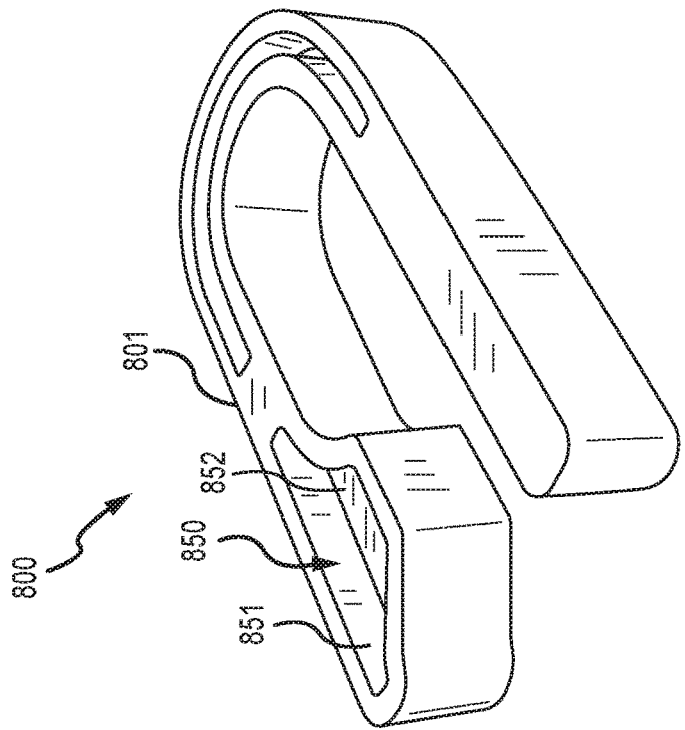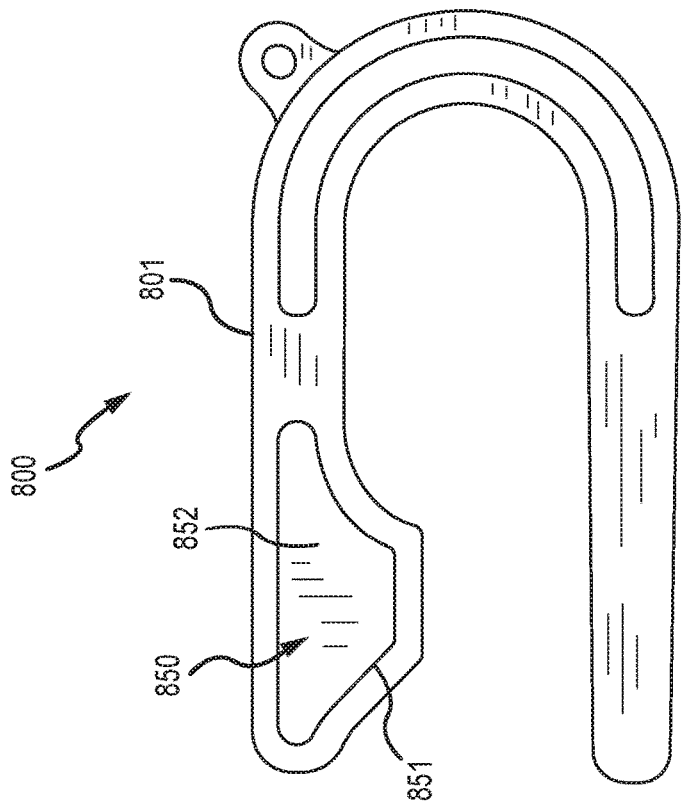

DEVICE AND SYSTEM FOR ASSISTING ACTUATION OF A BUCKLE RELEASE

CROSS-REFERENCE TO RELATED APPLICATIONS

This application claims the benefit of and priority to U.S. Provisional Application Ser. No. 62/415,407, entitled "DEVICE AND SYSTEM FOR ASSISTING ACTUATION OF A BUCKLE RELEASE," filed on Oct. 31, 2016. The entire disclosure of the aforementioned application is incorporated herein by reference for any purpose.

FIELD

The present disclosure relates to a device and system for actuation of a buckle release. In particular, the disclosure relates to a device and system that can be used to assist actuation of buckle release buttons in restraint system buckles.

BACKGROUND

Restraint systems such as child safety seats used in automobiles as well as restraint systems used in other settings frequently include a buckle-type fastening mechanism to secure two or more portions of the restraint system around a restraint system occupant. A buckle-type fastening mechanism generally includes a buckle attached to an end of a first section of restraint system belting and a tongue or latchplate portion attached to a second section of restraint system belting. The tongue is inserted into the buckle where it is releasably latched to secure the first and second sections of restraint system belting. Child safety seats frequently include a third section of belting with a second tongue that is inserted into the buckle adjacent the first tongue, with both tongues being secured by the buckle.

A buckle generally comprises a housing containing a spring-loaded latching mechanism for releasably latching the tongue or tongues within the buckle. A typical buckle housing comprises an aperture containing an actuating button for operating and releasing the latching mechanism. A spring in the latching mechanism exerts a bias urging the button and/or latching mechanism toward the latched position. The button can be operated by depressing the button using a thumb or fingertip against the bias of the spring with sufficient pressure to overcome the spring force of the latching mechanism and move the button and mechanism from the latched position to a release position, thereby causing the latching mechanism to release the tongue(s) from the latched condition. In a typical buckle, the area of the actuating button approximates or is configured to be pressed by a person's thumb or fingertip. The surface of the actuating button against which the thumb or fingertip presses is generally flush with or recessed from the surface of the housing surrounding the button.

A prior art buckle fastening system 100 is illustrated in FIGS. 1A and 1B. Buckle fastening system 100 includes buckle 101 comprising buckle housing 102 and buckle release button 103. Buckle fastening system 100 also includes first and second tongues 104 and 105. Buckle housing 102 has a depth d. Buckle housing 102 further includes a button surround 106 defining an opening in the front face of the buckle that defines the opening for buckle release button 103. Buckle release buttons can be configured in a variety of shapes, including the square and circular buttons 203A and 203B of prior art buckle fastening systems 200A and 200B illustrated in FIGS. 2A and 2B, respectively, as well as various other geometric and irregular shapes.

Buckle fastening systems such as those described above can be inconvenient or challenging for certain people to operate for various reasons, including individual variability in hand and finger size and strength, certain physical or medical conditions such as tendonitis and arthritis, and the like. Likewise, the force required for actuation of buckle releases used for certain car seat models can be relatively high, creating discomfort, pain, or fatigue for users, for example, that may be required to operate such a buckle on a frequent basis in various circumstances. Devices and systems that can be used to assist actuation of buckle releases are desirable.

The present disclosure provides devices and systems that can be used to assist actuation of a restraint system buckle release button.

SUMMARY

In various embodiments, a device for actuating a buckle release button can comprise a first arm, a second arm, and a connecting portion disposed between the first arm and the second arm. A first arm can comprise a first end and a button contact feature with a button contact surface. The first arm can define a first axis, and the second arm can define a second axis. The connecting portion can comprise a U-shape, and the first arm and the second arm can comprise a laterally-opposed configuration. A device for actuating a buckle release button can comprise an attachment feature. A device can have a unitary construction and can comprise a polymer material. A device can be configured to be elastically deformable in one of the first arm, the second arm, and the connecting portion to provide for movement of the button contact surface through a first deflection distance in response to a first deflection force. A device can be configured to provide a first restoring force in response to the movement through the first deflection distance. A device can comprise a first spring constant. A device can comprise a relief slot. A relief slot can be disposed in one of the first arm, the second arm, and the connecting portion of a device. A relief slot can provide for one of a reduced first restoring force and a reduced first spring constant relative to an equivalent device lacking a relief slot.

A first deflection distance can be sufficient to actuate a buckle release device. A button contact feature can comprise a button contact feature height. The button contact feature height can be configured to provide buckle housing clearance at the first deflection distance. A device can comprise an inter-arm dimension. In various embodiments, an inter-arm dimension can be configured to provide a clearance fit with respect to a buckle housing. In various embodiments, an inter-arm dimension can be configured to provide a compression fit with respect to a buckle release button. Insertion of a buckle into a device configured to provide a compression fit with respect to a buckle release button can produce a first deflection force, and the first restoring force produced by the device in response to the first deflection force can provide buckle release actuation assistance.

In various embodiments, a system for actuating a buckle release is provided. A system can comprise a buckle release device and an attachment device. A buckle release device can comprise an attachment feature configured to receive an attachment device. The attachment device can be inserted into the attachment feature and can be removably attached to the attachment feature. An attachment device can comprise one of a key ring, a carabiner, a steel cable loop, a chain, a wire, and a lanyard. A system in accordance with various embodiments can comprise one of a flashlight and a seat belt cutter.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIGS. 8A and 8B illustrate side and perspective views of a device for actuating a buckle release button in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, the term "actuate" means to cause a device to operate, such as a fastening mechanism release.

As used herein, the term "spring constant" means an approximation of a factor characteristic of an elastically deformable material in a particular configuration within the elastic limits of the material in the configuration.

As used herein, the term "unitary construction" means constructed of a single piece of material.

Figure 1A:
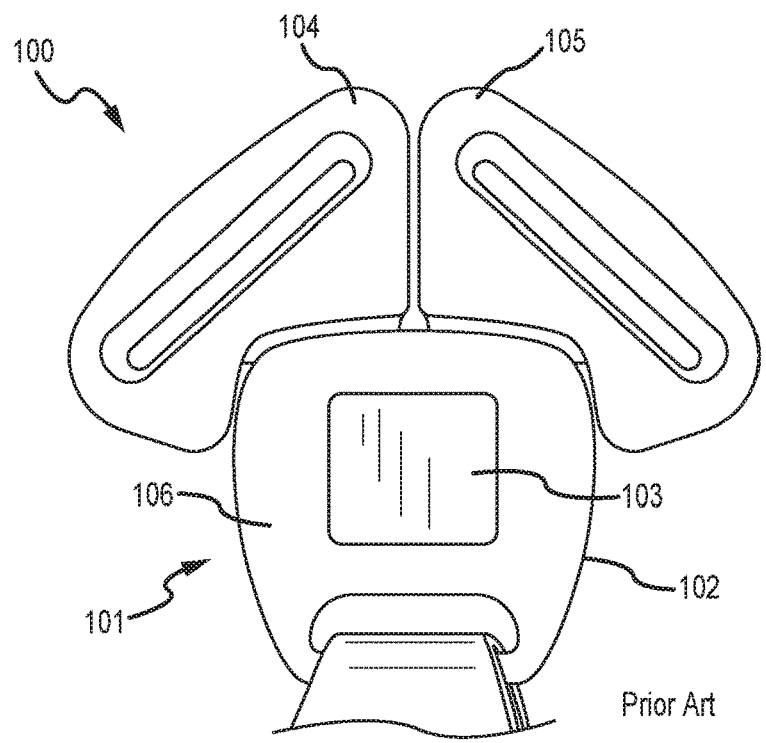
FIGS. 1A and 1B illustrate front and side views of a prior art buckle fastening system, respectively.
Figure 1B:
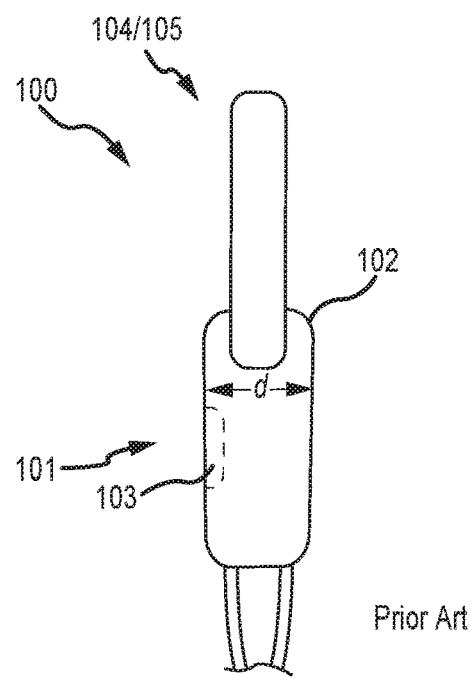
Figure 2A:
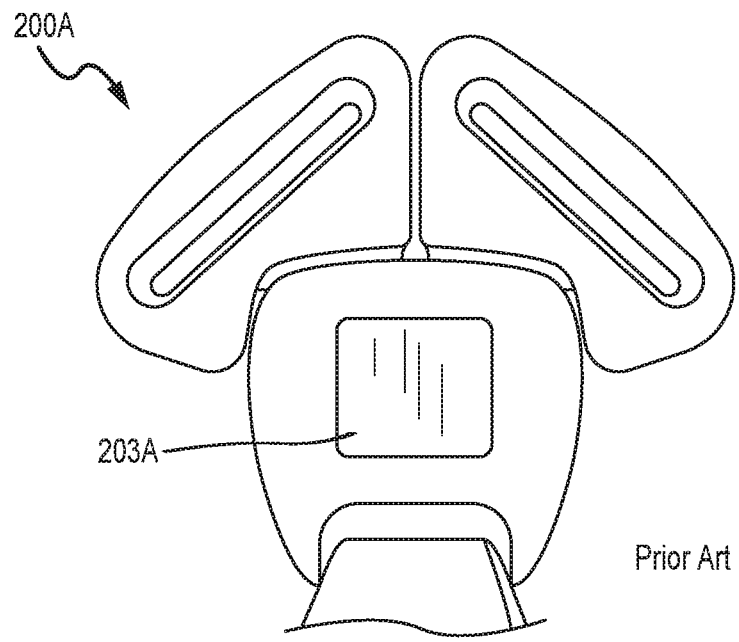
FIGS. 2A and 2B illustrate prior art buckle fastening systems having different buckle release button shapes.
Figure 2B:
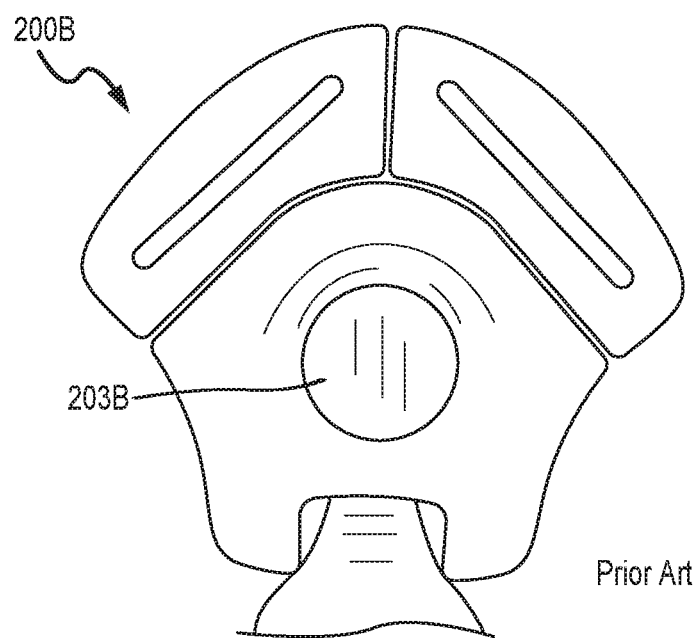
Figure 3A:
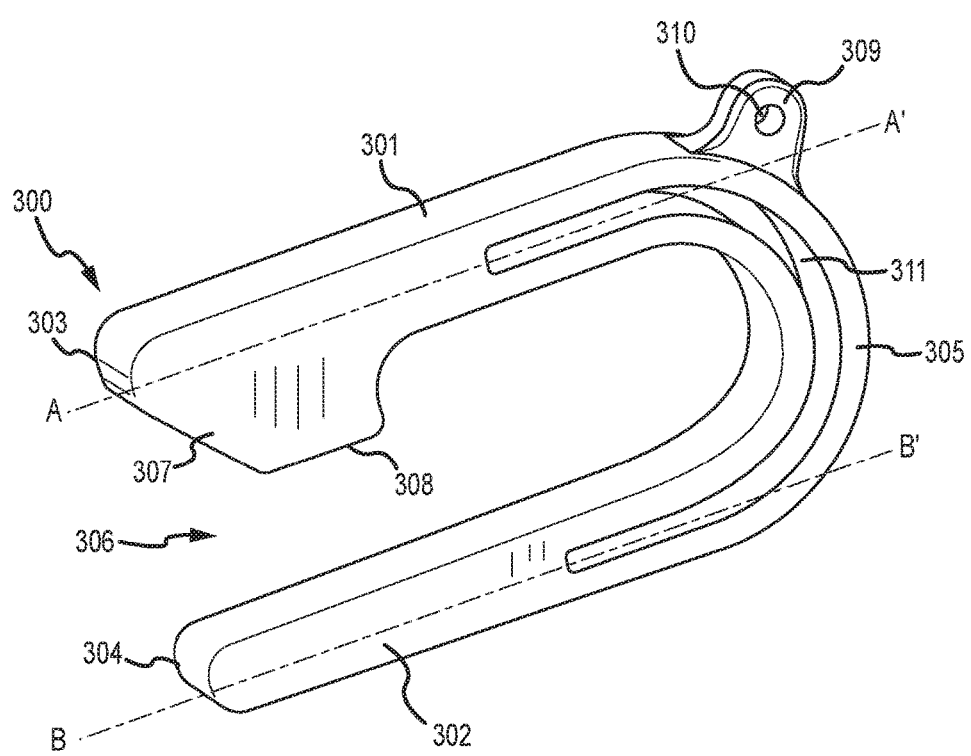
FIGS. 3A and 3B illustrate perspective views of a device for actuating a buckle release button in accordance with various embodiments.
Figure 3B:
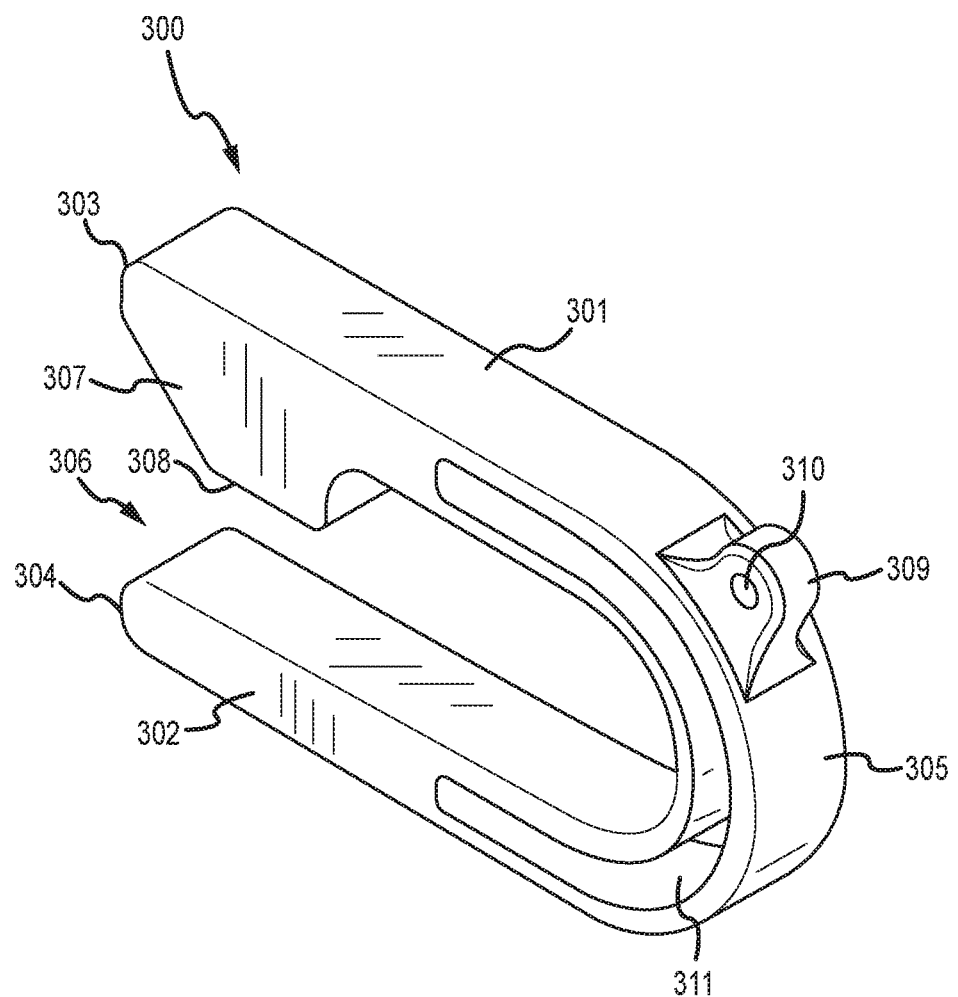

With reference to FIGS. 3A and 3B, a device 300 is illustrated. As described herein, device 300 can be used to assist actuation of a buckle fastening system. In accordance with various embodiments, device 300 can comprise a first arm 301, a second arm 302, and a connecting portion 305 disposed between the first arm and the second arm. First arm 301 can have an elongated configuration and define a first axis A-A', and second arm 302 can have an elongated configuration and defines a second axis B-B'. In various embodiments, a first arm, second arm, and/or connecting portion can have a square or rectangular cross section, or they can have a circular, ellipsoid, or other geometric or non-geometric cross section. Device 300 can be configured such that first arm 301 and second arm 302 comprise a laterally-opposed configuration, as illustrated, with distal end 303 of first arm 301 and distal end 304 of second arm 302 configured opposite one another. Connecting portion 305 can comprise a U-shaped segment joining the proximal ends of first arm 301 and second arm 302. In various embodiments, axes A-A' and B-B' of a device such as device 300 can be substantially aligned with one another, or the axes may converge or diverge from the distal ends of the first and second arms to the proximal portion of the arms. In various embodiments, a connecting portion can have other configurations or profiles, such as a rectangular profile or any other profile suitable to provide a first device arm and a second device arm in a laterally-opposed configuration.

First arm 301 and second arm 302 can define a buckle space 306 between the interior surfaces of the arms. Device 300 can comprise a button contact feature 307 extending into the buckle space 306 from the interior surface of first arm 301. Button contact feature 307 can comprise a button contact surface 308 facing toward second arm 302. Button contact feature 307 may be located near the distal end of first arm 301. In various embodiments, first arm 301 may extend distally past the location of button contact feature 307. Button contact feature 307 and button contact surface 308 can be configured to operatively engage a buckle fastening system button, as described in greater detail below.

Figure 6:
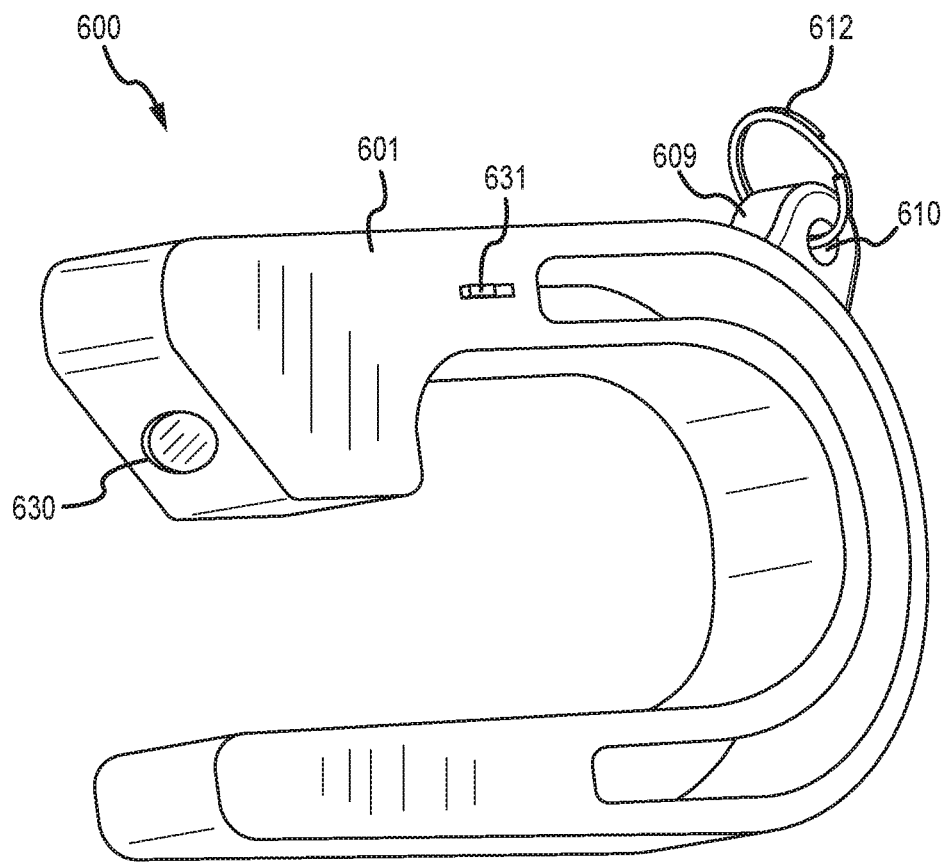
FIG. 6 illustrates a front perspective view of a device for actuating a buckle release button in accordance with various embodiments.

In various embodiments, device 300 can comprise an attachment feature 309. An attachment feature such as attachment feature 309 can comprise a flange or protrusion configured to facilitate attachment of device 300 to a set of keys, for example, by using an attachment device such as a key ring, carabiner, a steel cable loop, a chain, a wire, or a lanyard. Attachment feature 309 can comprise an aperture 310 through which an attachment device can be inserted. With reference briefly to FIG. 6, a key ring 612 is illustrated inserted into aperture 610 of attachment feature 609 for device 600. With reference once more to FIGS. 3A and 3B, attachment feature 309 can be located on an outer surface of connecting portion 305, first arm 301, or second arm 302, or any other suitable location. In various embodiments, a connecting feature need not comprise a protrusion, and instead can comprise an aperture or other feature of device 300 that does not extend from a surface of device 300.

In various embodiments, device 300 can comprise a relief slot 311. Relief slot 311 can be disposed in one of the first arm 301, the second arm 302, and the connecting portion 305. In various embodiments, relief slot 311 may be disposed in more than one portion of device 300. For example and as illustrated, relief slot 311 extends through connecting portion 305 and into proximal portions of first arm 301 and second arm 302. In various embodiments, a relief slot may also serve as an attachment feature. In various embodiments and as further described below, a relief slot such as relief slot 311 may be configured to reduce one of the first restoring force and the first spring constant of device 300 as compared to an equivalent device that is not configured with a relief slot.

In various embodiments, a device such as device 300 may be manufactured from a polymer material. Polymer materials that may be used can include, for example, high density polyethylene (HDPE), acrylonitrile butadiene styrene (ABS), polypropylene (PP), polyester (PES), polyethylene terephthalate (PET), polyvinyl chloride (PVC), polyamides (PA) including various nylons, polyethylene/acrylonitrile butadiene styrene (PE/ABS), and polycarbonate (PC), polycarbonate/acrylonitrile butadiene styrene (PC/ABS), as well as various resins or materials compatible with various additive manufacturing processes and/or 3D printers, such as Stratasys PolyJet materials. In various embodiments, a device can comprise natural materials such as wood, bamboo, hemp- or algal-based biopolymers, and the like. Natural materials can be used in a composite material, for example, a wood and adhesive laminate (i.e., plywood). In various embodiments comprising a laminated material, layers may be oriented such that the layer arrangement is visible in a side view. In various embodiments comprising laminate wood or plywood, the grains of the veneers may be configured to permit a suitable level of flexibility and/or a suitable spring constant. Composite materials such as carbon fiber-, graphite fiber-, and graphene fiber-reinforced polymers may be used in a device in accordance with various embodiments. Likewise, a device can comprise metals or metal alloys including steel, titanium, chromium, cobalt-chrome, stainless steel, aluminum, and the like.

In various embodiments, a device such as device 300 can comprise a phosphorescent (and/or photoluminescent) material to provide the device with a capacity to glow in dark conditions. For example, a phosphorescent material such as zinc sulfide or strontium aluminate can be incorporated into the device, such as by incorporation into a polymer composite used to manufacture the device or by applying to the device in a coating. Use of phosphorescent material in a device to confer a glow-in-the-dark characteristic can facilitate a user's ability to locate the device under dark conditions.

In various embodiments, a device such as device 300 may be unitarily constructed, such as by injection molding or additive manufacturing as a single component. In various other embodiments, a device can comprise two or more components attached to one another by various mechanical attachment methods including adhesives, welding, fastening, joinery, hinge, or other mechanical attachment. For example and with reference briefly to FIG. 5, device 500 comprises a hinge 520 configured in the connecting portion 505 between first arm 501 and second arm 502. Any of a variety of hinge configurations may be suitable for use in a device in accordance with various embodiments of the present disclosure. In various embodiments, a hinge or other mechanical attachment can include a spring configured to bias the first arm and the second arm of the device toward an open position suitable to receive a buckle in buckle space 506.

Figure 5:
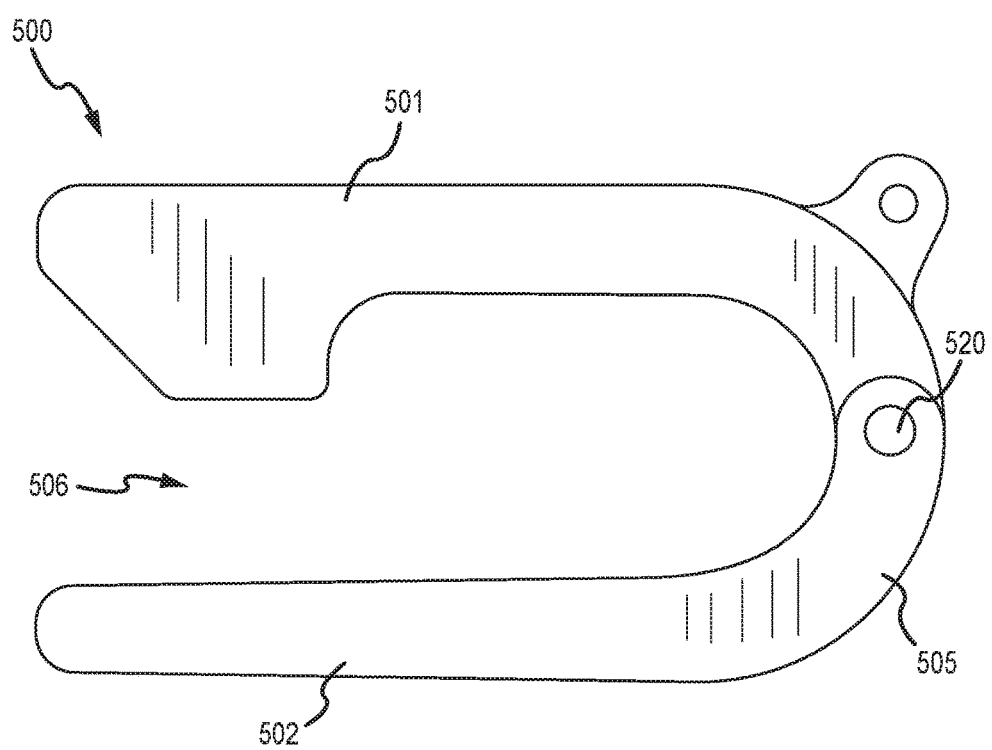
FIG. 5 illustrates a side view of a device for actuating a buckle release button in accordance with various embodiments.

With reference again to FIGS. 3A and 3B, the illustrated device 300 comprises a unitary construction. Device 300 can be configured to be elastically deformable in one of the first arm 301, the second arm 302, and the connecting portion 305. The elastically deformable configuration of device 300 can provide for movement of button contact surface 308 through a first deflection distance relative to the position of the second arm 302 in response to a first deflection force. The device can be configured to produce a first restoring force in response to movement through the first deflection distance biased in a direction opposite the first deflection distance. In various embodiments, the first restoring force can be produced as a function of the spring constant of an elastically deformable material used to fabricate the device, for example, for unitarily constructed devices such as device 300, in response to movement of the device through the first deflection distance. In various other embodiments, the first restoring force can be produced by a spring or other component of a mechanical connection, such as the hinge mechanism illustrated for device 500 (FIG. 5).

Figure 4:
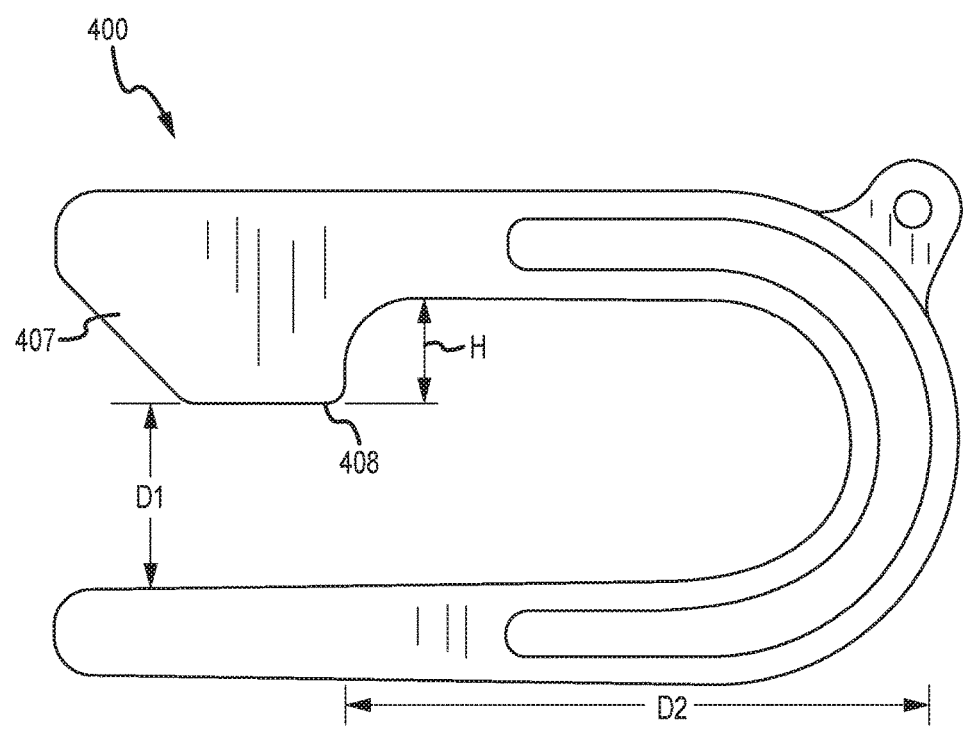
FIG. 4 illustrates a side view of a device for actuating a buckle release button in accordance with various embodiments.

In various embodiments, the first deflection distance can be in a direction toward the second arm. For example and with reference now to FIG. 4, typical buckle housings used for buckle fastening mechanisms may have buckle housing depths of from about 0.75 in to about 1.25 in. A device such as device 400 can be configured such that distance D1 (i.e., the inter-arm dimension) provides for clearance of a typical buckle housing relative to a buckle housing depth dimension, enabling an operator to insert device 400 around a buckle housing without deflection or deformation of the device. The operator may position device 400 relative to the buckle so that button contact feature 407 is positioned over the buckle release button. When device 400 is suitably positioned, the operator may squeeze device 400 to compress the device, engaging button contact surface 408 with the underlying buckle release button as the button contact surface travels through the first deflection distance in response to the first deflection force provided by the operator. In operation, the first deflection distance may be suitable to actuate the buckle release button, releasing the buckle from the latched condition to the unlatched condition. A device may be configured to provide a first deflection distance suitable to produce a sufficient button travel distance for various buckle release buttons. For example, the button travel distance required for actuation of various buckle release buttons can be from about 0.10 in to about 0.40 in. A device may also be configured to provide any additional deflection distance necessary to provide a device with a clearance fit (i.e., the distance between the button contact surface and the button surface). In various embodiments, a device may be configured to provide a first deflection distance within the range of from about 0.10 in to about 1.30 in. In various embodiments, a device can be configured to be compatible with a particular buckle fastening system or with selected buckle fastening systems, and different devices can be configured to operate with different buckle fastening systems. A device in accordance with various embodiments can be configured to provide a first deflection distance sufficient to produce actuation of various buckle release buttons for any buckle fastening system now in existence or that may be produced in the future.

In operation of a device in accordance with the embodiment described above providing a clearance fit relative to a buckle fastening system, an operator must overcome the restoring force produced by the device in response to elastic deformation of the device and movement of the button contact surface through the first deflection distance. In various embodiments, the restoring force and/or spring constant of the device may depend on the configuration of the device, including, for example, the materials, dimensions, and other features of the device. Additionally, in operation of a device in accordance with the embodiment described above, the operator must overcome the force biasing the buckle release button toward the latched position. The restoring force and/or spring constant of a device may depend on the configuration of the device, including the material used, the shape and dimensions of the device, the presence, location, and configuration of features such as a relief slot or a hinge, and the like. In various embodiments, a device can be configured such that the force required to produce a first deflection distance suitable to actuate a buckle release button can be from about 1.0 newtons to about 8.0 newtons. For example, the force required to produce the first deflection distance may be about 1.0, 1.5, 2.0, 2.5, 3.0, 3.5, 4.0, 4.5, 5.0, 5.5, 6.0, 6.5, 7.0, 7.5, or about 8.0 newtons. In various embodiments, the force required to produce a first deflection distance suitable to actuate a buckle release button can be produced by a device operator with a grip force that is lower than that of an average population to allow a device to be operated by individuals with various physical conditions that may negatively affect grip force. For example, a grip force required to produce a first deflection distance suitable to actuate a buckle release button can be less than about 50 N, or less than about 40 N, or less than about 30 N, or less than about 25 N, or less than about 20 N, or less than about 15 N, or less than about 10 N. In various embodiments, a device can comprise a relief slot such as relief slot 311 (FIG. 3) that may be configured to provide a reduced first restoring force and/or spring constant as compared to an equivalent device comprising the same material and the same dimensions but lacking the relief slot.

In accordance with various embodiments of the present disclosure, a device can be configured to provide suitable strength and structural rigidity for durability and reliable operation of the device over many buckle release cycles. A device can also be configured to provide a restoring force and/or spring constant during operation of the device to produce a first deflection distance that is sufficiently low that it is not prohibitive to users. For examples, users of a device may have certain physical or medical limitations that present challenges to compression of a buckle release button without the aid of a device as disclosed herein, or to compression of a device such as those disclosed herein that do not include a feature configured to reduce the restoring force and/or spring force constant such as a relief slot or a hinge. A relief slot can be disposed in one of the first arm, the second arm, and the connecting portion. The configuration of a relief slot, including the position and size can be adjusted to "tune" the restoring force and/or spring force constant of a device. For example, a longer or a wider relief slot can produce a decreased spring force constant compared to a shorter or a narrower relief slot.

In various embodiments, a device can be configured with relief areas. A relief area may be provided for various reasons, such as to reduce the amount of material required to manufacture a device and/or to reduce the occurrence of manufacturing irregularities such as sink marks or depressions that may occur in thicker portions of injection molded devices. With reference briefly to FIGS. 8A and 8B, a device 800 with a relief area 850 is illustrated. Relief area 850 is defined by a perimeter wall 851 and an inner wall 852. Device 800 can comprise a pair of relief areas such as relief area 850 configured on opposite sides of first arm 801.

In various embodiments, a configuration of a device such as device 400 (FIG. 4) can provide an operator with certain benefits facilitating exertion of sufficient force to produce the first deflection distance. For example, the configuration of the device can provide enhanced ergonomics, such as by providing added surface area by which an operator can exert force on the buckle release button, permitting engagement of additional fingers or portions of the operator's hand(s), or by providing a mechanical advantage, such as by extension of the distal ends of the first arm and/or the second arm distally from the connecting portion (i.e., the fulcrum) to produce enhanced leverage (i.e., via a class two lever) with the operator able to exert force distally to the button the load).

In various other embodiments, a device such as device 400 can be configured such that distance D1 provides for a compression fit around a buckle housing and/or buckle release button. For example, a device can be configured such that distance D1 is less than a buckle housing depth and/or a distance from the front face of a buckle button in a latched position and the back of the buckle housing. In such an embodiment, insertion of a device around a buckle will produce a first deflection distance resulting in the buckle contact surface moving away from the second arm of the device. A tapered front surface of the button contact feature may facilitate opening of the arms of the device and movement of the buckle contact surface through a first deflection distance in response to contact with a button housing and lateral pressure and movement of the device relative to the buckle housing to produce insertion of the buckle. The first restoring force produced by the device can provide buckle release actuation assistance, with the bias of the device in a direction opposite of that producing the first deflection distance tending to produce depression of a buckle release button when the button contact surface engages the button. In various embodiments, a device can be configured such that the restoring force is sufficient to actuate a buckle release button, or a device can be configured such that the restoring force is sufficient to partially actuate a release button, and further compressive force must be provided by an operator to fully actuate a buckle release button. In such embodiments, the compressive force provided by an operator may be less than that required for an equivalent device configured to provide a clearance fit rather than a compression fit.

In various embodiments, the button contact feature may be configured to engage and/or actuate a buckle release button of one or more buckle fastening systems. For example, the button contact surface may be configured with a length and a width suitable to engage a button surface of one or more buckle fastening systems without interference from a surrounding buckle housing. For example, a button contact surface may be configured with a length and width of about 0.5 in in each dimension, and such a button configuration may be compatible with square or rectangular buttons as well as round, oval, or irregularly shaped buttons with dimensions larger than that of the button contact surface. Likewise, a button contact feature may be configured with a button contact feature height H (FIG. 4) suitable to provide actuation of one or more buckle fastening system buttons while preventing contact or interference between the buckle housing and the inner surface of the first arm (i.e., buckle housing clearance) during operation, such as when the button contact feature has moved through a first deflection distance. Moreover, a device may be configured with a buckle space depth D2 suitable to prevent interference between an inner wall of the connecting portion and the lateral wall of a buckle housing, and/or to provide sufficient space for an operator to insert one or more fingers between the inner wall of the connecting portion and the buckle housing to facilitate removal of the device from the buckle following actuation of the buckle release button. In various embodiments, D2 can be from about 1.25 in to about 2.5 in.

A device disclosed herein may provide certain advantages, such as reducing pressure transmitted from the buckle housing to a restrained child or passenger during actuation of the buckle release button due to the laterally-opposed configuration of the first arm and the second arm. In contrast, simple operation of a button by depression with an operator's finger or other prior art tools for pressing a button that lack an opposing arm either transmit pressure through the buckle housing to the person under the buckle housing or require the operator to use his hand or fingers to provide an opposing force. In addition, the devices disclosed herein do not require attachment to the buckle or an associated strap, as required by other prior art devices. Instead, the devices disclosed herein are designed to be removably inserted around a buckle with each use, with the device remaining under the control and supervision of a mature operator, for example, a driver or parent, thereby preventing inadvertent or unsupervised operation by a restrained child or other passenger at inappropriate moments.

In various embodiments, a system that can be used to assist actuation of a buckle release button is provided. A system can comprise a device in accordance with the present disclosure. A system can further comprise an attachment device. The attachment device can be connected to the attachment feature. An attachment device can comprise a ring, a chain, a carabiner, a wire, a cable, a lanyard, a strap, or similar device. An attachment device can be any device suitable to attach the device, for example, to an operator's key set or other similarly accessible and portable accessory.

In various embodiments, a system can comprise a light. A light can be incorporated in a buckle release device. For example and with reference to FIG. 6, a light 630 can be inserted into distal end of first arm 601 of device 600. A light can also be inserted in other locations in a device, such as the second arm or the connecting portion. A system can comprise, for example, an LED flashlight removably inserted into a buckle release device. A system can further comprise a battery for a light inserted into the buckle release device. The device can be configured so that the light and/or battery are removably inserted so that the battery can be replaced as needed. A system can further comprise a switch for operation of a light, such as switch 631. A switch may be co-located with the light and the buckle release device configured to permit access to the switch on the inserted light, or the switch may be located remotely from the light, with wiring or other circuitry running between the light and the switch. A switch may be located in a position that provides for convenient operation of the light during operation of the buckle release device, such as insertion of the buckle release device over a buckle.

In various embodiments, a system can comprise a whistle. A whistle may be attached to a buckle release device or integrated into a buckle release device. A whistle may provide an operator with convenient access to a safety whistle for use in emergency situations.

In various embodiments, a system can comprise a glass breaker. A glass breaker can comprise a pointed steel tip, such as a tungsten carbide tip, attached to the buckle release device. A glass breaker can also comprise an automatic center punch tool, such as a spring loaded automatic center punch. A glass breaker may be attached, for example, at the distal end of the first arm or the second arm or to an outer wall of the connecting portion.

Figure 7:
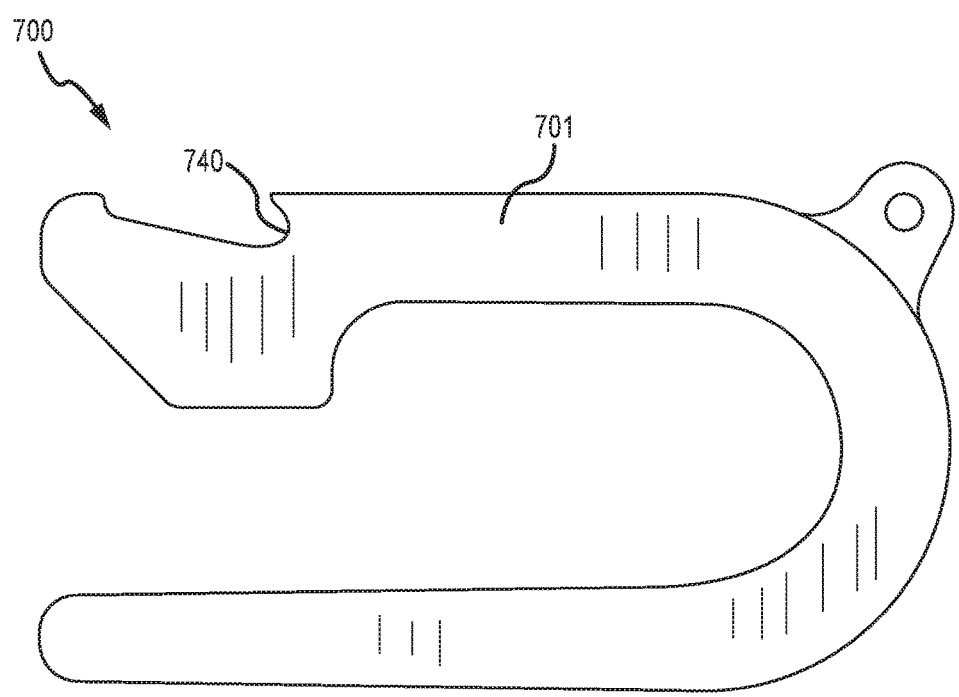
FIG. 7 illustrates a side view of a device for actuating a buckle release button in accordance with various embodiments.

In various embodiments, a system can also comprise a bottle opener. With reference to FIG. 7, a system can comprise a device 700 with a bottle opener 740 located in an outer wall of first arm 701. A system can comprise a device with a bottle opener located in other locations of the device, such as the second arm or the connecting portion.

Figure 9A:
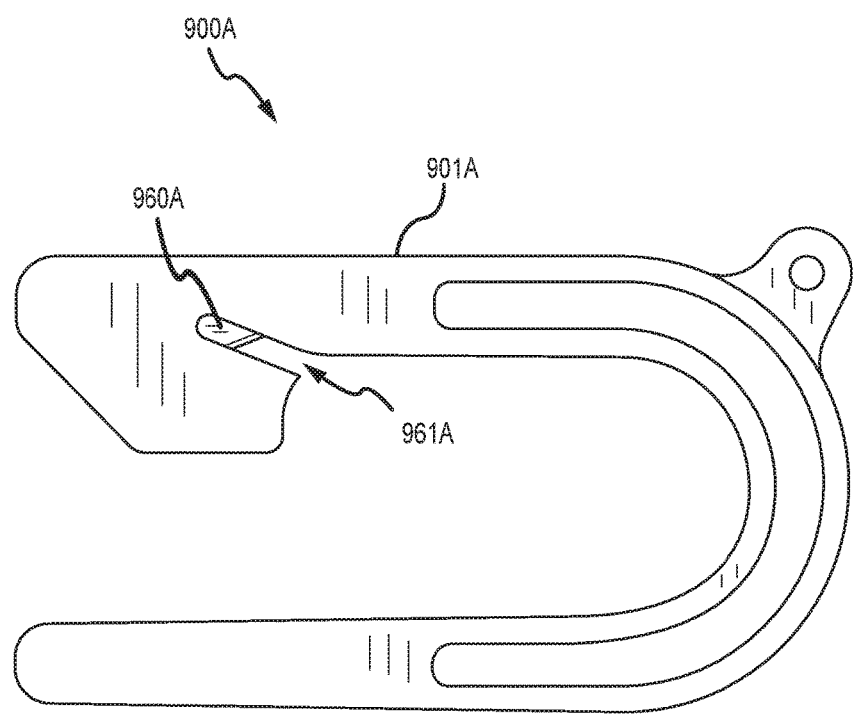
FIGS. 9A and 9B illustrate side views of devices for actuating a buckle release button that include a belt cutter in accordance with various embodiments.
Figure 9B:
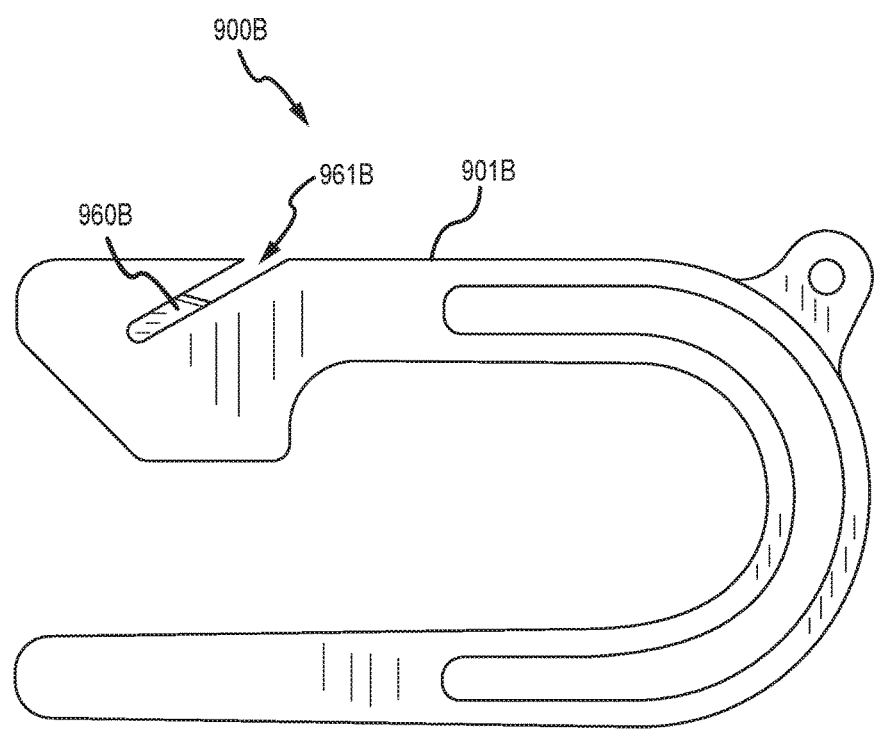

In various embodiments, a system can comprise a seat belt cutter. A seat belt cutter can be integrated into a buckle release device for use in emergency situations. Referring now to FIGS. 9A and 9B, devices with integrated seat belt cutters are shown. Device 900A illustrated in FIG. 9A includes a seat belt cutter comprising blade 960A embedded in first arm 901A of device 900A with a belt slot 961A opening into the interior of the device. Device 900B illustrated in FIG. 9B includes a seat belt cutter comprising blade 960B with a belt slot 961B opening toward the top of first arm 901B. In operation, a device such as device 900A or 900B comprising a seat belt cutter is positioned such that a seat belt is inserted into the opening of a belt slot such as 961A or 961B, and the device is moved relative to the inserted seat belt such that the blade (e.g., blade 960A or 960B) contacts and cuts the inserted seat belt. In various embodiments, a seat belt cutter may be configured so as to minimize risk of inadvertent contact with clothing or a child or person restrained by a buckle fastening mechanism during use of the buckle release device. For example a seat belt cutter may comprise a removable safety gate that can be opened to expose the seat belt cutter blade and permit insertion of a seat belt into the cutter.

EXAMPLE 1

Non-Destructive Defection Test Data for Device Prototypes Constructed from ABS and Polypropylene Prototypes of a device for actuating a buckle release in accordance with various embodiments of the present disclosure were manufactured from acrylonitrile butadiene styrene (ABS) and from polypropylene and subjected to non-destructive testing to determine the pressure required to achieve various deflections of the button contact surface. The results are shown in Table 1.

TABLE 1

Results of non-destructive deflection distance testing.

| Pressure | Polypropylene Deflection | ABS Deflection |
| --- | --- | --- |
| 0.42 lbs | 0.05 in | 0.10 in |
| 0.98 lbs | 0.16 in | 0.24 in |
| 1.40 lbs | 0.31 in | 0.46 in |

For the polypropylene prototype, 1.63 lbs of pressure was required to produce sufficient deflection of the button contact surface to contact the opposite arm (0.56 inches of deflection). For the ABS prototype, 1.74 lbs of pressure was required to produce sufficient deflection of the button contact surface to contact the opposite arm (0.67 inches of deflection).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices, systems, and methods are provided herein. It the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A unitarily constructed device for actuating a buckle release button comprising:
    a first arm, wherein the first arm comprises a first end, a button contact feature comprising a rectangular cross section and a button contact surface, and a first arm inner surface defining a first arm inner surface plane, and wherein the first arm defines a first axis;
    a second arm, wherein the second arm comprises a second end and a second arm inner surface defining a second arm inner surface plane that is substantially parallel to the first arm inner surface plane, and wherein the second arm defines a second axis substantially parallel to the first axis;
    a connecting portion disposed between the first arm and the second arm, wherein the connecting portion comprises a U-shape configured to dispose the first arm and the second arm in a laterally-opposed position; and
    an attachment feature disposed on the connecting portion.

2. The device of claim 1, wherein the device is configured to be elastically deformable in one of the first arm, the second arm, and the connecting portion to provide for movement of the button contact surface through a first deflection distance in response to a first deflection force, and wherein the device is configured to produce a first restoring force in response to the movement through the first deflection distance.

3. The device of claim 2, wherein the device comprises a first spring constant.

4. The device of claim 3, wherein the device comprises a relief slot disposed in the connecting portion.

5. The device of claim 2, wherein the first deflection distance is sufficient to actuate a buckle release button.

6. The device of claim 2, wherein the button contact feature comprises a button contact feature height, and wherein the button contact feature height is configured to provide buckle housing clearance at the first deflection distance.

7. The device of claim 2, wherein the device comprises an inter-arm dimension.

8. The device of claim 7, wherein the inter-arm dimension is configured to provide a clearance fit with respect to a buckle housing.

9. The device of claim 7, wherein the inter-arm dimension is configured to provide a compression fit with respect to a buckle release button.

10. The device of claim 9, wherein insertion of a buckle into the device produces the first deflection force, and wherein the first restoring force produced by the device provides a buckle release actuation assistance.

11. A system comprising:
    a buckle release device; and
    an attachment device;
    wherein the buckle release device comprises:
        a first arm connected to a second arm by a U-shaped connecting portion, the device having a unitary construction with each of the first arm, the second arm, and the connecting portion comprising a rectangular cross section, the first arm comprising a first arm inner surface defining a first plane and a first arm outer surface defining a second plane, the second arm comprising a second arm inner surface defining a third plane and a second arm outer surface defining a fourth plane, the first plane, second plane, third plane, and fourth plane being substantially parallel to one another, the first arm inner surface being continuous with the second arm inner surface, and the first arm outer surface being continuous with the second arm outer surface, and
        an attachment feature configured to receive the attachment device; and
    wherein the attachment device is inserted into the attachment feature.

12. The system of claim 11, wherein the attachment device is one of a key ring, a carabiner, a steel cable loop, a chain, a wire, and a lanyard.

* * * * *

(12) EX PARTE REEXAMINATION CERTIFICATE (11724th)
United States Patent
Riley-Carter et al.

(10) Number: US 10,271,617 C1
(45) Certificate Issued: Sep. 8, 2020

(54) DEVICE AND SYSTEM FOR ASSISTING ACTUATION OF A BUCKLE RELEASE

(71) Applicant: Namra LLC, Quartz Hill, CA (US)

(72) Inventors: Kristin Riley-Carter, Quartz Hill, CA (US); Mauro Riley-Guglielmo, Quartz Hill, CA (US)

(73) Assignee: NAMRA LLC, Quartz Hill, CA (US)

Reexamination Request:
No. 90/014,430, Jan. 14, 2020

Reexamination Certificate for:
Patent No.: 10,271,617
Issued: Apr. 30, 2019
Appl. No.: 15/799,911
Filed: Oct. 31, 2017

Related U.S. Application Data

(60) Provisional application No. 62/415,407, filed on Oct. 31, 2016.

(51) Int. Cl.
*A44B 11/25* (2006.01)
*A44B 15/00* (2006.01)
*B60N 2/28* (2006.01)

(52) U.S. Cl.
CPC ...... *A44B 11/2573* (2013.01); *A44B 11/2523* (2013.01); *A44B 11/2526* (2013.01); *A44B 11/2546* (2013.01); *A44B 11/2549* (2013.01); *A44B 11/2511* (2013.01); *A44B 15/005* (2013.01); *B60N 2/2812* (2013.01); *B60N 2002/2815* (2013.01); *B60N 2002/2818* (2013.01)

(58) Field of Classification Search
None
See application file for complete search history.

(56) References Cited

To view the complete listing of prior art documents cited during the proceeding for Reexamination Control Number 90/014,430, please refer to the USPTO's public Patent Application Information Retrieval (PAIR) system under the Display References tab.

*Primary Examiner* — Russell D Stormer

(57) ABSTRACT

A device and system that can be used to assist actuation of a buckle release is disclosed. A device can include a first arm and a second arm joined by a U-shaped connecting portion. The device can also include a button contact feature. The device can be inserted over a buckle with the button contact feature over a buckle release button, and the device used to assist engagement of the buckle release button by a person operating the device. A system can include a device and various additional features or accessories.

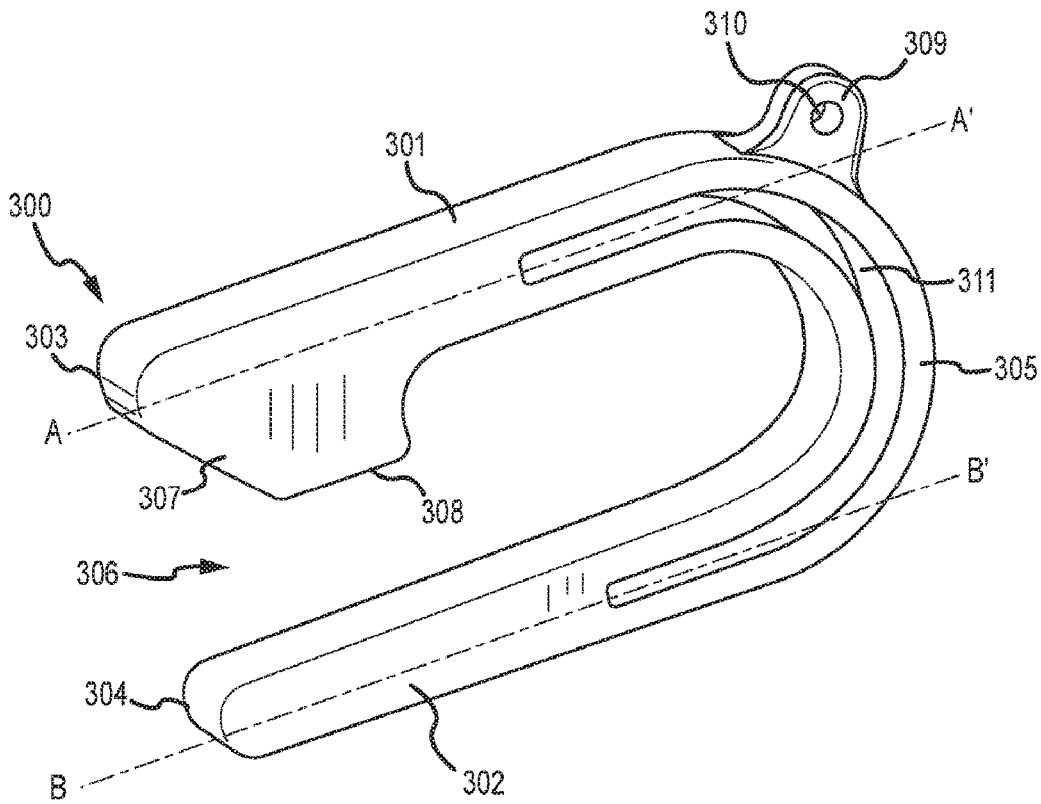

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 1 is confirmed.

Claim 2 is determined to be patentable as amended.

Claims 3-10, dependent on an amended claim, are determined to be patentable.

Claims 11 and 12 were not reexamined.

2. [The device of claim 1] *A unitarily constructed device for actuating a buckle release button comprising:*

*a first arm, wherein the first arm comprises a first end, a button contact feature comprising a rectangular cross section and a button contact surface, and a first arm inner surface defining a first arm inner surface plane, and wherein the first arm defines a first axis;*

*a second arm, wherein the second arm comprises a second end and a second arm inner surface defining a second arm inner surface plane that is substantially parallel to the first arm inner surface plane, and wherein the second arm defines a second axis substantially parallel to the first axis;*

*a connecting portion disposed between the first arm and the second arm, wherein the connecting portion comprises a U-shape configured to dispose the first arm and the second arm in a laterally-opposed position; and*

*an attachment feature disposed on the connecting portion, wherein the device is configured to be elastically deformable in one of the first arm, the second arm, and the connecting portion to provide for movement of the button contact surface through a first deflection distance in response to a first deflection force, and wherein the device is configured to produce a first restoring force in response to the movement through the first deflection distance.*

\* \* \* \* \*